United States Patent [19]

Mills

[11] 4,132,253
[45] Jan. 2, 1979

[54] MACHINE FOR NOTCHING PALLET STRINGERS

[76] Inventor: Thomas O. Mills, 219 N. Maple, Douglas, Kans. 67039

[21] Appl. No.: 771,980

[22] Filed: Feb. 25, 1977

[51] Int. Cl.² ............................................. B27C 5/00
[52] U.S. Cl. ................................. 144/133 R; 83/878; 83/425.3; 83/435.2; 144/3 R; 144/204; 144/323; 144/136 R; 144/326 R
[58] Field of Search ............... 83/5, 425.2, 425.3, 83/435.2, 917; 144/133 R, 133 A, 136 R, 41, 3 E, 2 R, 242 R, 242 B, 242 D, 245 R, 245 A, 321, 323, 326 R, 203, 204, 7, 3 R

[56] References Cited

U.S. PATENT DOCUMENTS

| 2,403,673 | 7/1946 | Mead | 144/245 A |
| 3,735,787 | 5/1973 | Siel | 144/133 R |

FOREIGN PATENT DOCUMENTS

| 1503961 | 9/1969 | Fed. Rep. of Germany | 144/133 |
| 1161973 | 3/1958 | France | 144/133 R |

Primary Examiner—Travis S. McGehee
Assistant Examiner—W. D. Bray
Attorney, Agent, or Firm—Edward L. Brown, Jr.

[57] ABSTRACT

A notching machine including a first cutting stage which makes four vertical cuts in the stringer, the outer two cuts defining the sides of the notch. The second cutting stage of the machine makes a horizontal cut which first separates a portion of the stringer between the inner two cuts thereby allowing the drive shaft of the second-stage cutting blade to pass through the partially formed notch and cut away the remaining portions of the stringer between the outer two cuts to define the notch.

5 Claims, 4 Drawing Figures

MACHINE FOR NOTCHING PALLET STRINGERS

BACKGROUND OF THE INVENTION

A conventional wooden pallet is made up of a plurality of stringer members sandwiched between a plurality of slat members. The slat members are transversely arranged with respect to the stringers and attached to the tops and bottoms of the stringers. The stringers all have a pair of notches cut along their bottom edge for receipt of the forks of a lift truck. Conventional pallets of this type can be picked up on any side by reason of the openings between the stringer members on two sides and the notches through the stringer members on the other two sides. Some pallets are formed with only a pair of stringer members, while the most conventional design includes three stringer members, one centrally positioned, with the remaining two abutting the outer edges of their corresponding slat members.

DESCRIPTION OF THE PRIOR ART

While pallet stringer notches were originally hand-cut, there have been numerous machines in recent years which automatically cut the notches as the stringers are forced through a machine in adjacent side-by-side relation. Examples of these machines are illustrated in U.S. Pat. Nos. 3,470,924 and 3,664,394. The first mentioned patent drives a row of pre-aligned stringer members past a rotating horizontally positioned cutting head which grinds away the entire area of the notch in an action similar to a routing tool. The second mentioned patent incorporates a gang of vertically positioned saw blades positioned in side-by-side relation which also grinds away the entire area of the notch as the stringer members are fed through the machine. Both of the above mentioned methods require a substantial amount of power since they grind away the entire notch area of the stringer. The basic advantage of the present invention is that it utilizes substantially less power by making a series of saw cuts in place of the grinding method of the two prior art systems mentioned.

Another object of the present invention is to provide a notching machine for pallet stringers which minimizes the amount of splitting during the formation of the notch.

Another object of the invention is to provide an automated notching machine for pallet stringers which cuts a pair of notches on a single pass through the machine while providing adjustment means for various length stringers.

These and other objects of the invention will become apparent from a reading of the following specification and claims together with the accompanying drawings which set forth the preferred embodiment of the present invention:

Figure 1:
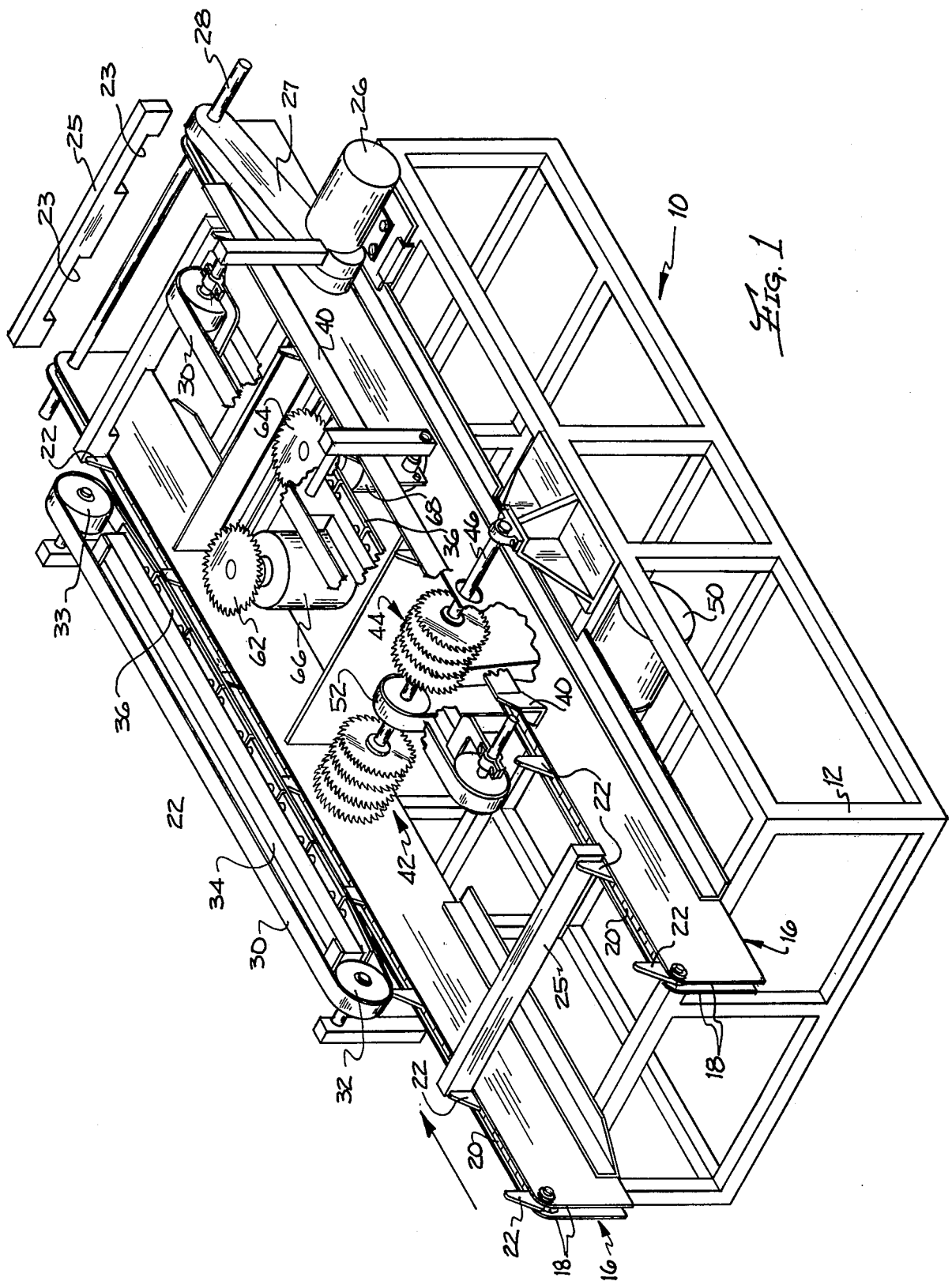
FIG. 1 is a perspective view of the notching machine of the present invention with portions of the machine broken away for clarity of illustration.

Referring in detail to the drawings, and more specifically to FIG. 1, the notching machine is generally referred to by reference numeral 10. The machine 10 is constructed on a tubular base frame 12 which supports a conveyor means generally identified by reference number 16. The conveyor means includes two pairs of stationary side plates 18 which house and track a pair of conveyor chains 20. Equally spaced along chains 20 are driving lugs 22 which force the stringer members 25 through the machine 10. Chains 20 are driven by electrical motor 26 through a chain and sprocket drive covered by shield member 27, which in turn drives shaft 28. Shaft 28 includes a pair of drive sprockets, not seen in the drawing, which in turn drive conveyor chains 20. Positioned directly above conveyor means 16 are a pair of free-wheeling belts 30 which assist in firmly holding the stringers 25 in place as they pass through the various cutting stages of the machine 10. Each belt 30 is mounted on a pair of fixed pulleys 32 and 33 and are assisted by a hold-down bar 34 which has a plurality of spring mounted shoes 36 extending downwardly therefrom in contact with the top side of belt 30. The shoes 36 assist belt 30 in maintaining a holding force on the top of stringer members 25. The stringers 25 are aligned laterally as they enter the machine in side-by-side relation by an alignment rail 40 located on both sides of the machine which aligns the stringers as they pass through the machine. Alignment rail 40 is adjustable, while not shown in the drawing, so that various length pallet stringers can be handled.

Figure 4:
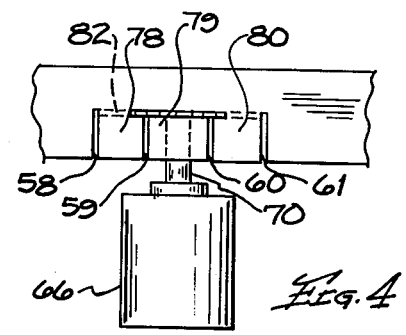
FIG. 4 is a partial elevation taken along lines 4 — 4 of FIG. 3.
Figure 3:
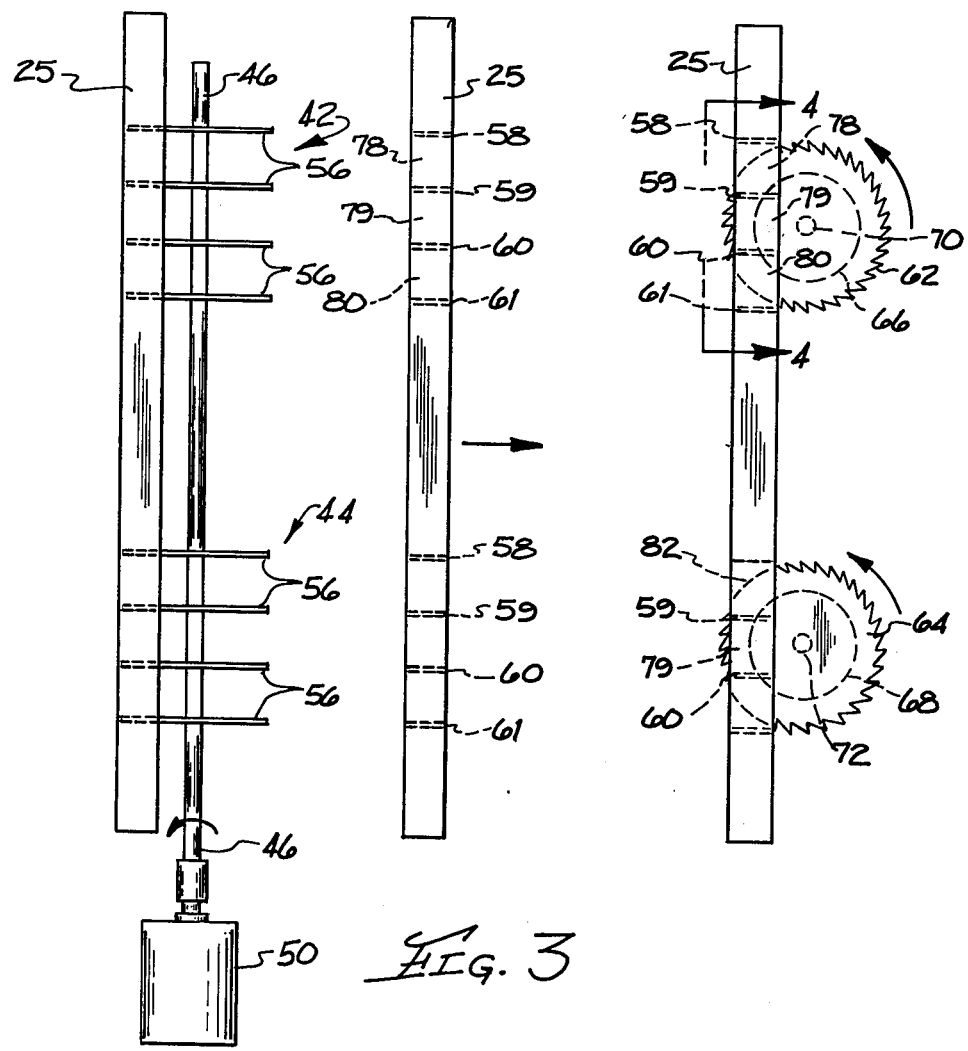
FIG. 3 is a top view of the stringers passing through the two cutting stages.

The first stage cutting means includes two groups of vertically positioned saw blades 42 and 44 both driven on a common shaft 46 by motor 50 through belt 52. Each group 42 and 44 includes four conventional saw blades 56, equally spaced on drive shaft 46, as also seen in FIG. 3. Each group of blades 56 makes four vertical cuts 58, 59, 60 and 61, as best seen in FIGS. 3 and 4. While groups of blades 42 and 44 are shown driven on a common shaft, they could also be separately driven. Also, the spacing between the innermost cuts 59 and 60 can be varied.

The second stage cutting means incorporates a pair of horizontally positioned saw blades 62 and 64 separately driven by motors 66 and 68, respectively. Saw blades 62 and 64 are directly driven by drive shafts 70 and 72, respectively. Saw blades 62 and 64 are positioned on machine 10 downstream from the first stage cutting means 42 and 44 in a position so that the driven shafts or saw blade arbors 70 and 72 are aligned between the two innermost saw cuts 59 and 60 made by the first stage cutting means.

An alternate structure to that shown in the drawing would be the substitution in place of the two innermost saw blades 56 with a single dado type cutting blade which makes a single cut sufficiently wide to pass the motor drive shafts 70 and 72 of the second stage cutting means.

OPERATION

Figure 2:
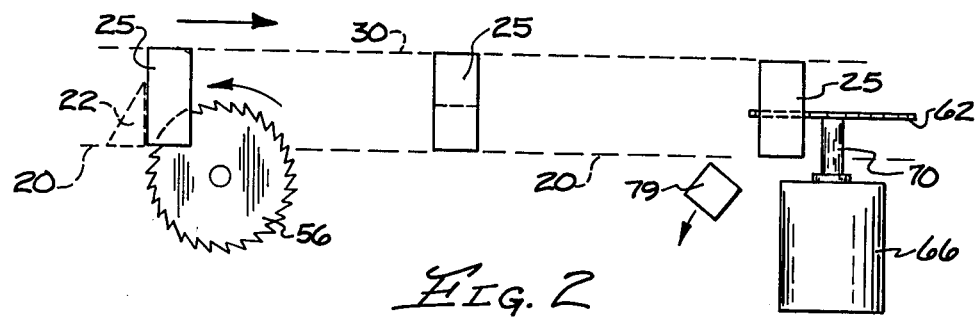
FIG. 2 is a side elevational view of the stringer passing through the two cutting stages.

Precut stringer members 25 of common length are placed upon the conveyor chains 20 at the left end of the machine, and are driven by lugs 22 towards the various cutting blades. As the row of stringer members 25 pass pulley 32, they are firmly held against conveyor chains 20 by hold-down belts 30. As the stringer members 25 reach the tapered end of alignment rail 40, they are all laterally aligned in side-by-side relation so that the notching cuts will all be located at the same position on each stringer member. As the stringer members 25 reach the first stage cutting means, blades 56 (as seen in FIGS. 3 and 2) make two groups of vertical cuts 58, 59, 60 and 61 along the bottom edge of the stringer. The four vertical cuts define the three separate notch portions 78, 79 and 80.

As the second stage saw blade 62 partially makes its horizontal cut 82 (FIGS. 2 position), center notch portion 79 falls away having been completely severed from the stringer 25. With notch portion 79 removed, saw blade arbor 70 is free to pass by the stringer and make the remainder of its cut 82 and sever portions 78 and 80, thereby completing notch 23.

While the drawings illustrate the spacing between vertical saw cuts 58, 59, 60 and 61 to be equal, the machine would function equally well with a narrower space between the two inner saw cuts 59 and 60 just so that space was sufficiently wide to pass the drive shaft or saw blade arbor 70.

Having described my invention with sufficient clarity to enable those familiar with the art to construct and use it, I claim:

1. A machine for cutting notches in pallet stringers comprising:
    a base frame;
    a conveyor means on the frame having drive members, which supports and drives the stringers in a lateral direction relative to their longitudinal dimension through the machine;
    a first cutting means including at least four vertically positioned and horizontally spaced saw blades rotatably mounted on the frame to make at least four parallel vertical cuts in each of the stringers as the conveyor means drives them through the machine;
    a second stage cutting means including a horizontally positioned saw blade with a downwardly extending drive shaft, the blade having a diameter substantially the same as the distance between the two outermost cuts made by the first cutting means; the second cutting means being positioned on the frame so that the blade first cuts away that portion of the stringer between the two innermost cuts thereby allowing said drive shaft to pass therethrough while cutting away the remaining portions of the stringer between the two outermost cuts.

2. A machine for cutting notches as set forth in claim 1, including:
    hold-down and alignment means on the frame which retain the stringers against the conveyor means in proper side-by-side alignment as the stringers are forced through the machine.

3. A machine for cutting notches as set forth in claim 1, wherein the horizontal spacing between the two innermost cuts of the first cutting means is at least as wide as the drive shaft diameter of the second cutting means.

4. A machine for cutting notches as set forth in claim 1, wherein the horizontal spacing between all of the cuts of the first cutting means is equal.

5. A machine for cutting notches in pallet stringers comprising:
    a base frame;
    a conveyor means on the frame having drive members which supports and drives the stringers in side-by-side relation through the machine;
    a first cutting means including a plurality of vertically positioned horizontally spaced saw blades rotatably mounted on the frame to make vertical cuts in each of the stringers as the conveyor drives them through the machine;
    a second stage cutting means including a horizontally positioned saw blade with a downwardly extending drive shaft, the blade having a diameter substantially the same as the distance between the outermost cuts made by the first cutting means; the second cutting means is positioned on the frame so that the blade first cuts away a portion of the stringer thereby allowing said drive shaft to pass therethrough while cutting away the remaining portions of the stringer between the outermost cuts.

* * * * *